(12) United States Patent
Allemann et al.

(10) Patent No.: US 9,494,400 B1
(45) Date of Patent: Nov. 15, 2016

(54) LINEAR MEASURING SYSTEM

(71) Applicants: Terry D. Allemann, Washington, MO (US); James D. Allemann, Eureka, MO (US)

(72) Inventors: Terry D. Allemann, Washington, MO (US); James D. Allemann, Eureka, MO (US)

(*) Notice: Subject to any disclaimer, the term of this patent is extended or adjusted under 35 U.S.C. 154(b) by 161 days.

(21) Appl. No.: 14/578,881

(22) Filed: Dec. 22, 2014

Related U.S. Application Data (60) Provisional application No. 61/920,609, filed on Dec. 24, 2013.

(51) Int. Cl.
*G01B 5/02* (2006.01)
*G01B 3/20* (2006.01)
*G01B 5/00* (2006.01)

(52) U.S. Cl.
CPC .............. *G01B 3/20* (2013.01); *G01B 5/0004* (2013.01); *G01B 5/02* (2013.01)

(58) Field of Classification Search
CPC ...... G01B 3/20; G01B 3/205; G01B 5/0004; G01B 5/02
USPC ......... 33/549, 555, 568, 573, 706, 712, 806, 33/810, 811
See application file for complete search history.

(56) References Cited

U.S. PATENT DOCUMENTS

| | | |
|---|---|---|
| 4,567,663 A | 2/1986 | Gillespie |
| 5,044,088 A * | 9/1991 | Peucker ............... G01B 5/20 33/550 |
| 5,167,077 A | 12/1992 | Etchell |
| 5,253,431 A | 10/1993 | Smith |
| 5,287,631 A * | 2/1994 | Stade ............... G01B 21/02 33/810 |
| 5,463,818 A * | 11/1995 | Hughes ............... G01B 3/18 33/549 |
| 5,973,494 A | 10/1999 | Masreliez |
| 6,002,250 A | 12/1999 | Masreliez |
| 6,044,571 A | 4/2000 | Strait |
| RE37,490 E | 1/2002 | Andermo |
| 6,817,109 B2 | 11/2004 | Wong |
| 7,845,092 B2 | 12/2010 | Rudy |
| 7,913,410 B2 * | 3/2011 | Monturo ............... G01B 3/04 33/506 |
| 8,225,522 B2 | 7/2012 | Prior |

FOREIGN PATENT DOCUMENTS

| | | | | |
|---|---|---|---|---|
| CN | 203177771 U | * | 9/2013 | ............ G01B 5/02 |
| CN | 203364705 U | * | 12/2013 | ............ G01B 5/02 |
| WO | WO 9417361 A1 | * | 8/1994 | .......... G01B 5/0004 |

* cited by examiner

*Primary Examiner* — R. A. Smith
(74) *Attorney, Agent, or Firm* — Creati Venture Law, LLC; Dennis J M Donahue, III (57) ABSTRACT

A linear measuring system has a base, a rail assembly with a pair of tracks, a channel between the tracks, a linear guide assembly with a bearing block and channel anvil, a linear encoder assembly with a scale and reader head, and a fixed anvil. The bearing block has an adjustable contact preload for sliding along the tracks. The bearing block varies the distance between the channel anvil and the fixed anvil, and reader head is connected to the bearing block and slides in reading engagement with the scale to determine the distance between the anvils. The channel's sides diverge from each other as they extend from the bottom to the top, and the channel anvil extends down to the bottom of the channel. The rail assembly can be formed from a single elongate beam with the channel on the beam's top side and the tracks on the beam's sides.

20 Claims, 7 Drawing Sheets

Section B-B (Detail)

LINEAR MEASURING SYSTEM

CROSS-REFERENCE TO RELATED APPLICATIONS

This application is a divisional/continuation/continuation-in-part of U.S. Patent Application No. 61/920,609 filed on Dec. 24, 2013 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to metrology, and more particularly to linear measurement systems.

Related Art

Prior art linear measurement devices with have used linear encoders to precisely measure various objects. These previously known linear measurement systems typically use flat tables, beds, beams or other planar structures to support an object to be measured and require an operator to ensure that the object is aligned relative to the measuring instrumentation. Typically, one end of an object is positioned on a support that is located near a fixed end that corresponds with the zero index for the measurement system, and the object is pushed against the fixed end; another end of the object is positioned on another support closer to a sliding platform or scale guide which is connected to the linear encoder's reader and provides the measurement based on the linear distance between the fixed end and the location of an indexed face of the platform.

To aid in the alignment, some of these measuring systems have used a pair of pins which extend up from the plane of the surfaces on which the objects rest. However, to properly an object, the operator must ensure that the object is pressed flush against both pins as well as the base anvil and either hold the object in place while measuring the object or otherwise secure the object in its aligned position. The need to secure the object flush against the pins in previous systems is particularly important for round objects, such as pins, rods, pipes and other cylindrical objects with a circular cross-sectional shape, because round objects can easily roll away from the pins while the operator is using the device to perform the measurement. Therefore, known systems require the time and expertise of the operator to ensure that the objects being measured are properly aligned. It would be beneficial to have a support system which self-aligns objects, especially round objects, to more quickly measure the objects and to avoid operator errors in the alignment of the objects which result in measurement errors.

Another problem with prior art measuring systems is that they suspend the objects being measured between two different surfaces. Therefore, even though these surfaces are in the same plane, an elongate flexible object that is suspended between the surfaces can bend below the plane of the surfaces in the space between the surfaces. The bending of the flexible object will result in measurement errors. It is possible to place additional support surfaces in the space between the surfaces, but this takes additional time and slows down the measurement process. Also, even when additional support surfaces are uses, it is also possible for flexible objects to bend between the pins. Adding a row of pins in the support surfaces to help prevent the bending would take even more time and further slow down the measurement process. Accordingly, there remains the need for a support system which self-aligns objects to be measured and which supports the objects along their entire length, especially elongate objects.

For the linear encoder to provide an accurate measurement of the object, it is also known that the sliding platform must be aligned with the linear encoder. The sliding platform should not wobble or be loose enough to have play between the location of the indexed face on the platform and the corresponding location of the reading head on the linear encoder. At the same time, the sliding platform should have a smooth operation without significant friction so that an operator can easily adjust the platform to bring it into contact with the object and not have to exert a force which may cause the part to bend. Most prior art linear measurement devices provide satisfactory operation when they are originally produced. However, the force necessary to move the sliding platform is set when the device is manufactured and is not adjustable for different types of objects that may be measured by the device. It would be beneficial to provide an adjustable friction setting for the sliding platform so that an operator can vary the feel while maintaining the alignment for different types of objects being measured.

Additionally, tolerances between subassemblies and parts of a machine may result in a loosening of the sliding platform and can produce hysteresis or slop in the measurements. Also, parts can wear during the lifetime operation of a device which can result in further loosening of the sliding platform such that the measurement system cannot be calibrated within the necessary measuring tolerances. To correct these deficiencies, current measurement systems require replacing the sliding platform. It would be beneficial for the measurement system to have a sliding platform which is aligned with the linear encoder and gives the proper feel for the measurement operation and which can also be adjusted to tighten the tolerances between the sliding platform and the linear encoder's reader. It would be particularly beneficial for a sliding scale to allow for adjustments throughout the useful life of the measurement device to avoid the need for replacing worn sliding platforms when other parts remain operational.

SUMMARY OF THE INVENTION

The present invention is directed to an electronic linear measuring system having a rail assembly with a pair of tracks, a channel which extends between the tracks, a linear guide assembly with a bearing block and a channel anvil, a linear encoder assembly with a scale and a reader head, and a fixed anvil. The bearing block slides on the tracks to vary the distance between the channel anvil and the fixed anvil. The reader head is connected to the bearing block and slides in reading engagement with the scale to determine the distance between the channel anvil and the fixed anvil. The bearing block slides on the tracks to move both the channel anvil and the reader head relative to an object situated in the channel and the scale so that their axes of travel are parallel to each other and respectively square to the object being measured and the scale being used to take the measurement readings.

In one aspect of the invention, the channel is formed as a cradle having sides which diverge from each other as they extend from the bottom of the channel to the top of the channel, and the channel anvil extends down to the bottom of the channel. In another aspect of the invention, rail assembly is formed from a beam and includes the channel on the top of the beam and the tracks on the sides of the beam. In yet another aspect of the invention, the linear guide assembly has an adjustment mechanism which allows for changing the contact preload between the sides of the bearing block and the corresponding sides of the tracks on which the bearing block slides.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description below and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

DETAILED DESCRIPTION OF THE PREFERRED EMBODIMENTS

The following description of the preferred embodiment(s) is merely exemplary in nature and is in no way intended to limit the invention, its application, or uses.

The invention is a linear measuring system 10 which includes a base 12 with a top surface 12a and a bottom surface 12b, a rail assembly 24 with a pair of tracks 14, a channel 16 between the tracks, a linear guide assembly 18 with a bearing block 28 and a channel anvil 30, a linear encoder assembly 22 with a scale 32 and reader head 34, and a fixed anvil 20. Exemplary embodiments of the linear measuring system are illustrated in FIGS. 1, 3 and 5-7, and as shown in these drawings, the rail assembly and the linear encoder assembly are attached to the top surface of the base. The operation of the linear measuring system is similar to prior linear measuring devices: the workpiece 100 which is some object to be measured is placed with one end against the stationary anvil 20 and another end facing the bearing block; the operator slides the bearing block 28 toward the workpiece until the moving anvil 30 comes into contact with it; and the reader head's position on the scale determines the distance between the anvils which corresponds with the length of the workpiece. Generally, the linear guide assembly can slides between positions proximate to the distal end and proximal end of the channel.

As explained in detail below, in one aspect of the present invention the channel is formed as a cradle 26 for the object 100 being measured with side surfaces 16a that diverge from each other as they extend from the bottom 16b to the top 16c, and the channel anvil 30 extends down to the bottom of the channel. This aspect of the invention improves the support and also the alignment of the workpiece 100. In the second aspect of the invention, the rail assembly is formed from at least one beam 36 and includes the channel 16 on the top 36a of the beam, and the tracks on the sides 36b of the beam. This aspect of the invention eliminates the risk for a misalignment between the tracks 16 and the channel 16 which prevents alignment errors in the measurements because the alignment of the tracks define the movement of the linear guide assembly as the bearing block 28 slides along the tracks, and the channel 16 is used to align the object 100 being measured. In the third aspect of the invention described below, the linear guide assembly has an adjustment mechanism 18a which allows for changing the contact preload 38 between the sides 28a of the bearing block and the corresponding sides 14a of the tracks on which the bearing block 28 slides. This aspect of the invention provides an adjustable friction setting for the bearing block 28 as it slides relative to the tracks 14 and also allows for adjusting the linear guide assembly 18 throughout the useful life of the measurement device 10 to avoid the need for replacing the assembly as the contact points between the tracks and the bearing block may wear down during the device's operational lifecycle.

The linear guide assembly 18 slides between the ends 14b', 14b" of the tracks which have longitudinal axes 14c', 14c" that are parallel to each other. The channel has a proximal end 16d' and a distal end 16d" that are respectively proximate to the corresponding ends of the tracks 14b', 14b". The channel has a central longitudinal axis 16e that is parallel to the longitudinal axes 14c of the tracks, and the sides of the channel are positioned on opposite sides of the central longitudinal axis and face inwardly towards the central longitudinal axis. Generally, the channel has a V-shaped cross-section 16f in a plane perpendicular to the central longitudinal axis. One benefit of the present invention over previously known linear measurement devices is the support provided by the channel 16. As described above, the channel 16 is formed as a cradle 26 to support the objects along their entire length, especially elongate objects. As shown in FIG. 4D, prior art support systems would only support the workpiece at discrete surfaces that are longitudinally separated so that the workpiece would be suspended between the surfaces, allowing the workpiece to bend below the plane of the surfaces in the void between the surfaces which would introduce an error in the measurement of the workpiece. In comparison, as shown in FIG. 4E, the present invention supports the workpiece along its entire length, thereby eliminating this potential source of measurement error.

Additionally, the shape of the channel 16 is particularly beneficial because the channel walls 16a converge as they extend downward to the bottom 16b of the channel. The converging walls self-align round objects 100a within the channel and prevent such object from rolling away from the alignment provided by the channel. For objects with an elongate cylindrical body 100a', such as pins, rods, pipes and other cylindrical objects with a circular cross-sectional shape, the pull of gravity on the object combined with the converging wall shape holds the workpiece in place, aligned within the walls of the channel, and prevents the workpiece 100 from becoming misaligned as the operator slides the linear guide assembly along the tracks.

In the preferred embodiments, there is a space 40 located between the channel's proximal end 16d' and the fixed anvil 20 which is aligned with the channel's central longitudinal axis. For objects that have a larger diameter head portion 100a" connected to the elongate cylindrical body 100a', the head portion can extend below the bottom of the channel into the space 40. Generally, the space and the channel together serve as a jig for elongate rods and pins with heads. It will be appreciated that other jig designs could also be produced to correspond with other workpiece shapes.

Figures 1, 2A:
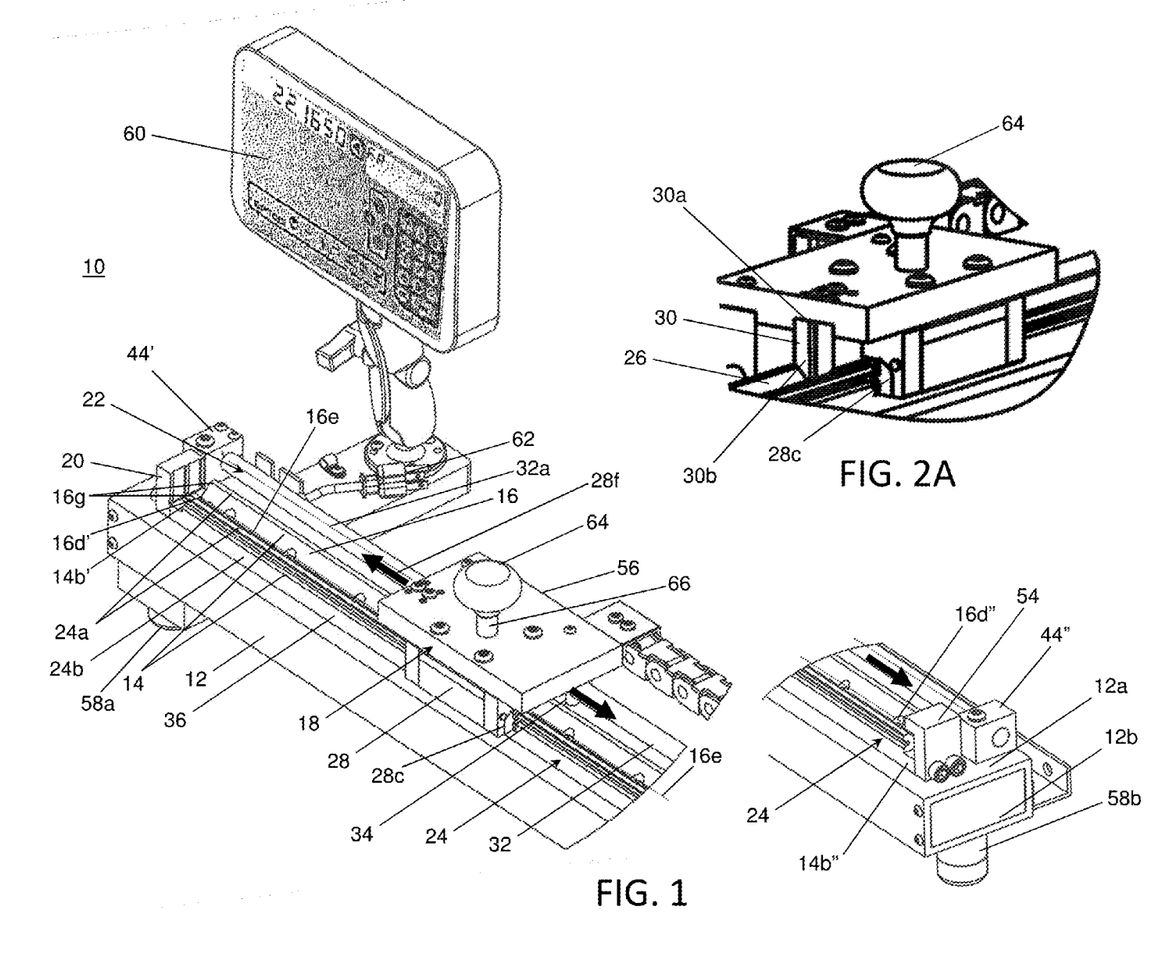
FIG. 1 is a perspective view of a linear measurement device according to the present invention.
FIG. 2A is a detail perspective view of the linear guide assembly mounted on the rail assembly for the linear measurement device of FIG. 1.
Figures 2B, 2C, 2D:
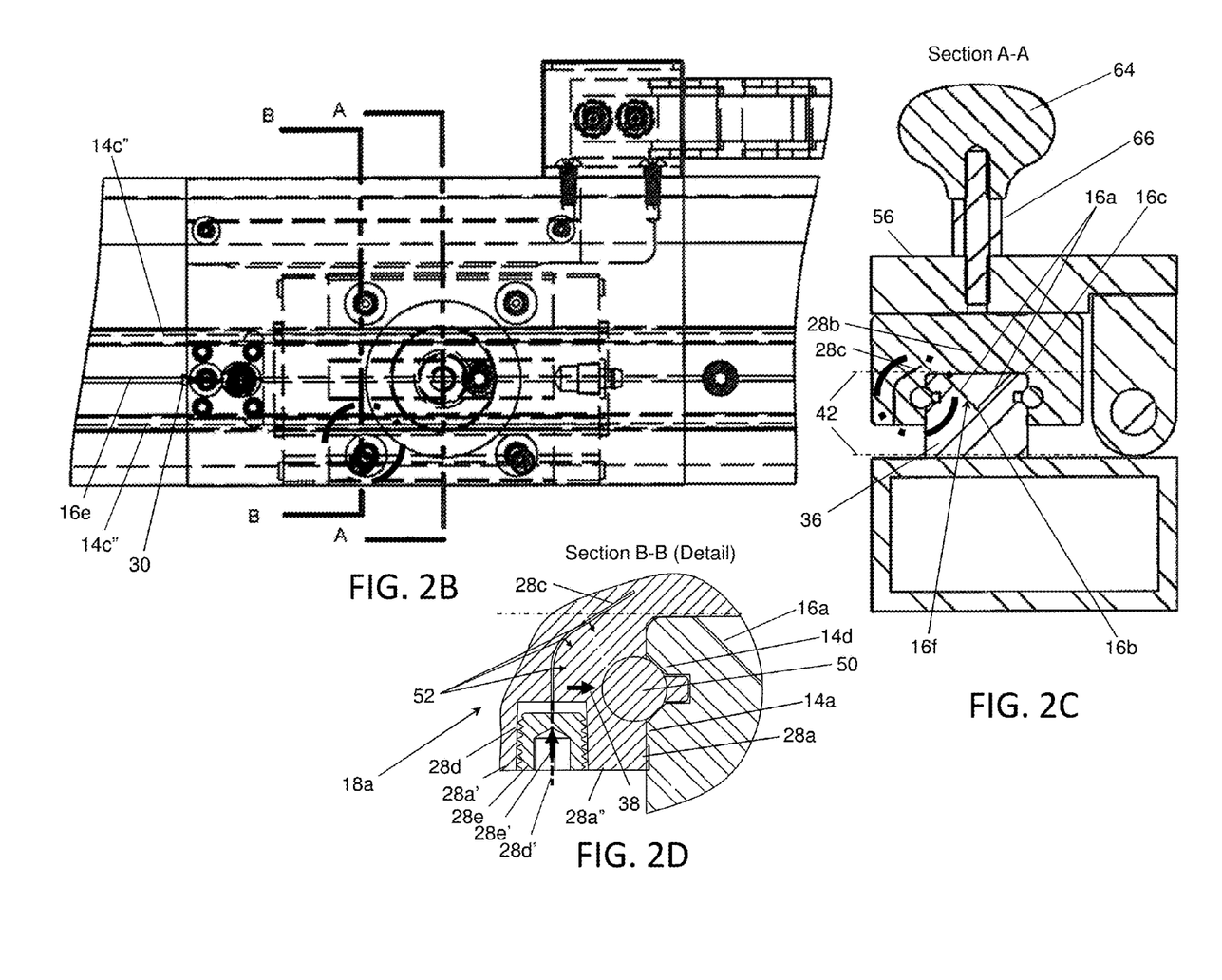
FIG. 2B is a plan view of the linear guide and rail assemblies of FIG. 2A.
FIG. 2C is a cross-sectional view through section A-A in FIG. 2B.
FIG. 2D is a detail cross-sectional view through section B-B in FIG. 2B.
Figure 3:
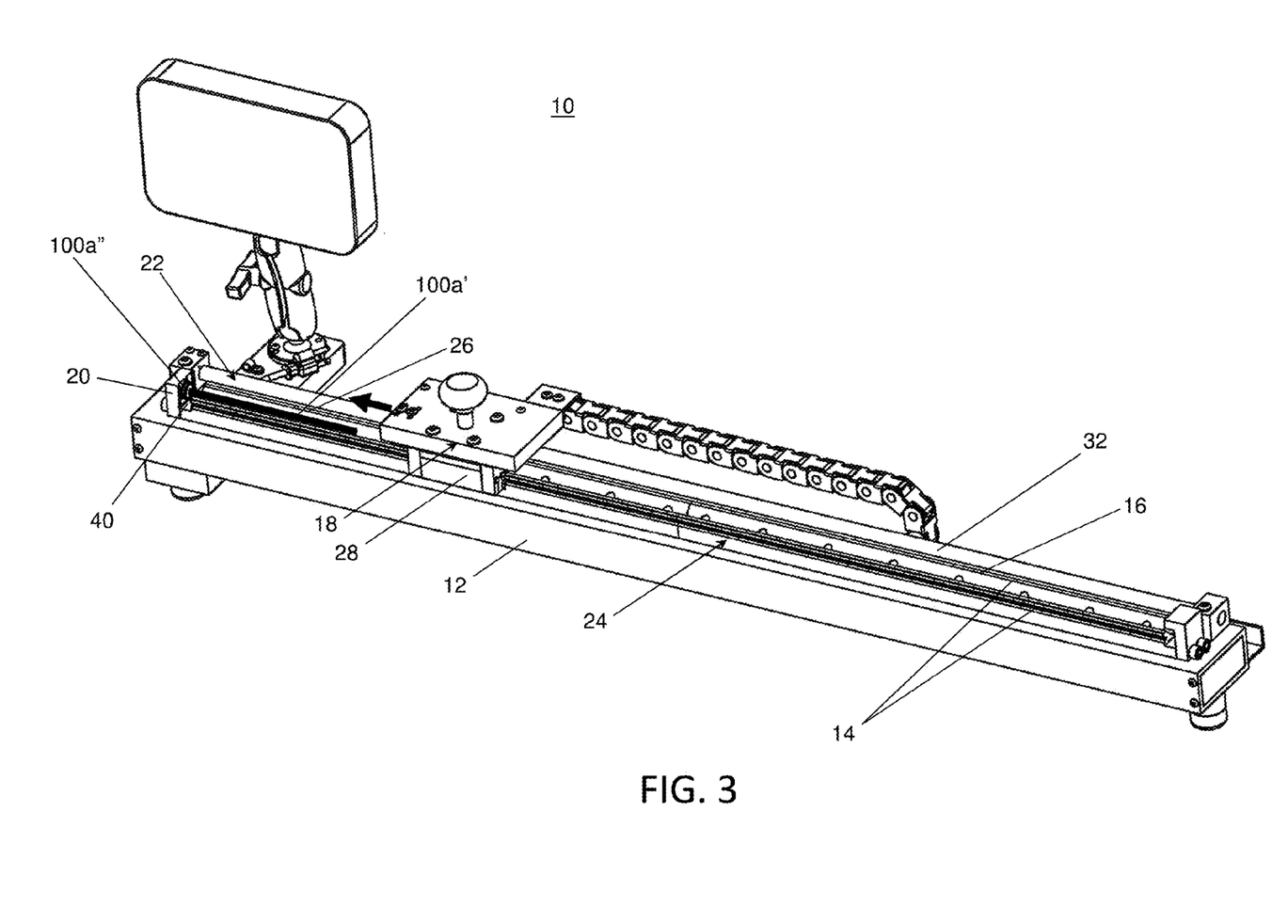
FIG. 3 is a perspective view of the linear measurement device of FIG. 1.
Figure 5:
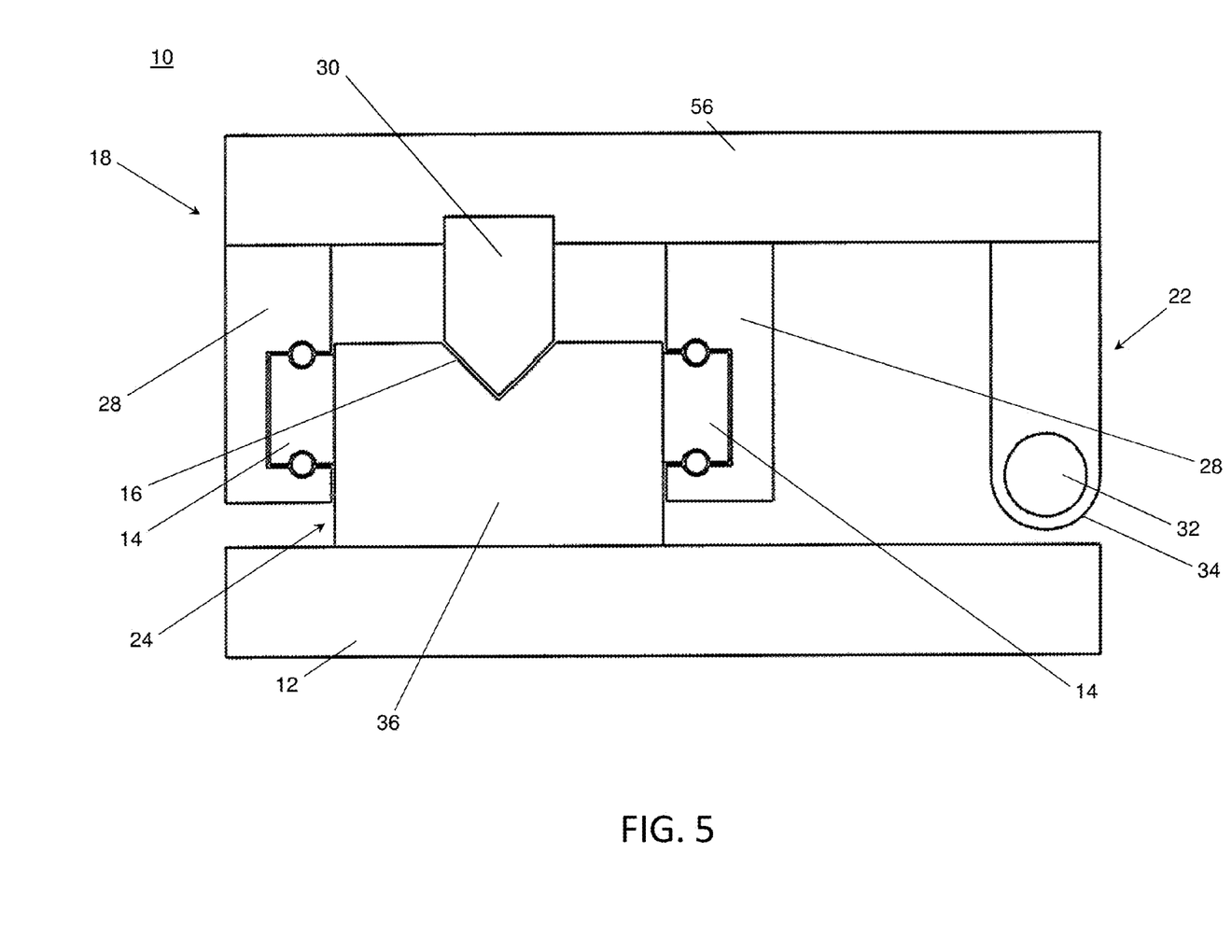
FIGS. 5-7 are cross-sectional views of alternative arrangements of parts and subassemblies for the linear measurement device according to the present invention.

In the embodiments shown in FIGS. 1, 3 and 5, the channel can be formed in the top side of a single elongate beam 36. In the embodiments shown in FIGS. 6 and 7, the channel can be formed by the region between the top sides of a pair of cylindrical shafts 36', 36" which are adjacent to and in contact with each other. In each one of these embodiments, the channel side walls extend to a pair of upper sides or edges 16g, and the rail assembly's top side has a pair of top surfaces 24a extending between the upper portion of the channel and the rail assembly's outwardly facing sides 24b. As particularly illustrated in FIG. 2C, the top surfaces of the rail assembly are preferably situated in a plane 42 that is parallel to the top surface of the base. The bearing block 28 is positioned over the channel's upper edges and slides on the pair of tracks between the first and second position. The channel anvil 30 has a mounting end 30a that is connected to the bearing block above the channel's upper edges and also has a cantilevered end 30b that extends downwardly from the mounting end to a location proximate to the channel's bottom below the channel's upper edges and the channel's side surfaces.

In each one of the embodiments, the use of a recess in the rail assembly's top side for the channel and its outwardly facing sides for the tracks themselves or for machining the tracks or mounting the tracks reduces the potential for alignment errors between the track and the channel. In the preferred embodiment, the rail assembly is formed by a single beam, and the elongated tracks are attached to or formed in the outwardly facing sides.

The linear encoder is connected to the base through a proximal anchor 44' and a distal anchor 44". The proximal and distal anchors are respectively secured to the base 12 proximate to the proximal and distal ends of the channel 16. The elongate scale 32 extends between the anchors and is aligned with and offset from the channel. The scale 32 has a longitudinal axis 32a substantially parallel to the central longitudinal axis 16e, and the reader head 34 is secured to the bearing block 28 and slides in reading engagement with the scale. Preferably, the top side of the rail assembly is above the scale so that wide, non-cylindrical items can extend over the scale 32 when they are supported by the top surfaces 24a of the rail assembly. For example, as shown in FIG. 4A, the workpiece 100b has a substantially flat surface wider than the elongated channel and is supported by the top surfaces.

Figure 4A:
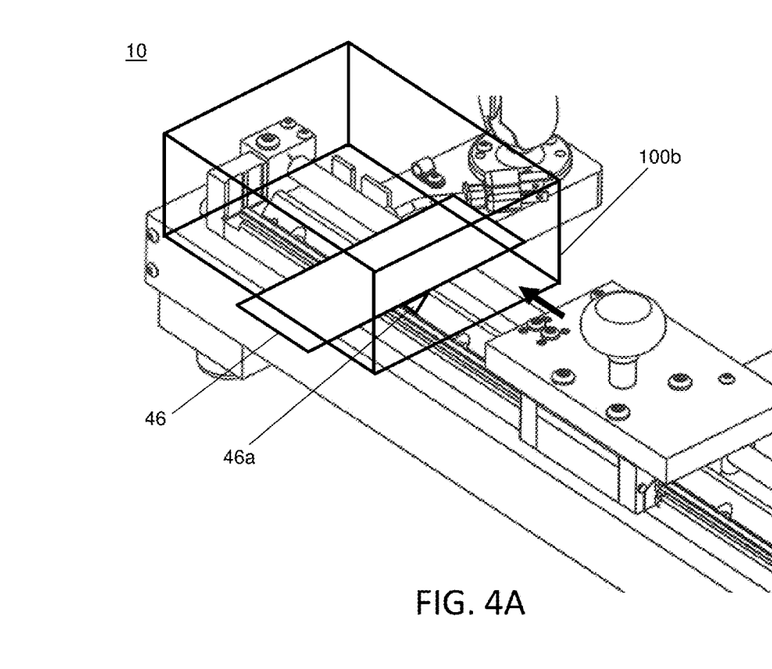
FIG. 4A is a perspective view of the linear measurement device of FIG. 1 with an object on a platform above the cradle for measurement.
Figure 4B:
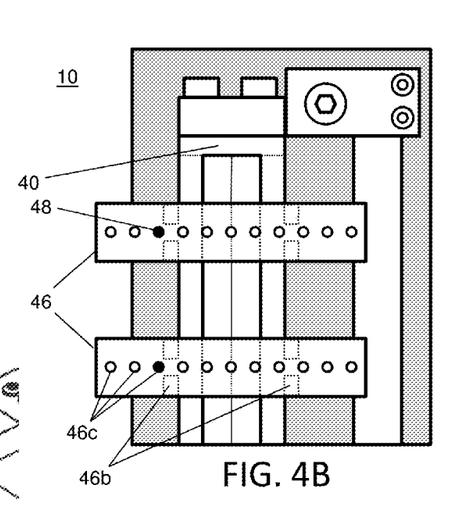
FIGS. 4B and 4C are respectively a plan view and an end view of multiple platforms situated within and over the cradle.
Figure 4C:
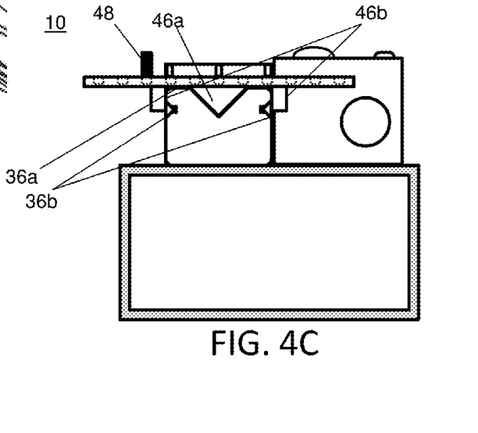
Figure 4D:
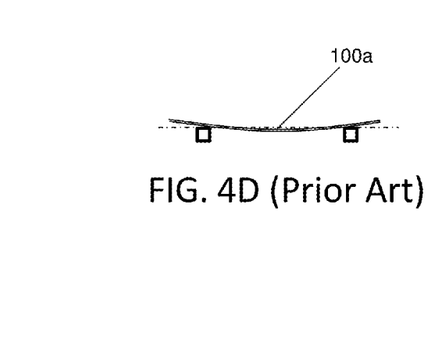
FIGS. 4D and 4E are schematic side views of an object on supports in a prior art measurement device and on the cradle support of the present invention, respectively.
Figure 4E:
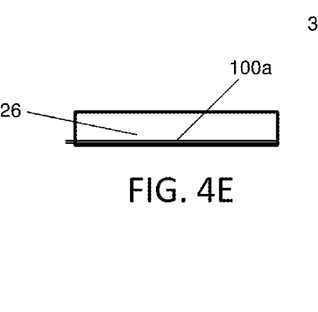

As also shown in FIG. 4A and in FIGS. 4B and 4C, the present invention allows for the mounting of one or more fixtures 46 to the rail assembly to help support and align the workpiece 100 between the fixed anvil 20 and the channel anvil 30. The fixture is removable from the rail assembly for an elongated cylindrical workpiece cradled in the elongated channel as described above. To help stabilize the workpiece 100b on the fixture 46, a channel block 46a and side arms 46b may extend down from the bottom side of the fixture and respectively engage with the channel and the sides of the rail assembly. Additionally, the template may have one or more rows of holes in which an alignment pin 48 can be secured to provide for a lateral alignment of the workpiece.

In a preferred embodiment, the tracks 14 are formed as grooves 14d machined into the outwardly facing sides of a single beam 36. Preferably, the bearing block 28 a center portion 28b between the sides 28a. The center portion moves between its lengthwise positions along a lengthwise axis 28f that is substantially parallel to the longitudinal axes 14c', 14c" of the tracks 14 and the central longitudinal axis 16e of the channel 16. Sets of ball bearings 50 are housed in the sides and are engaged with the grooves. A top plate 56 is bolted to the top of the bearing block 28 and carries the reader head 34. As indicated above, the linear guide assembly may include an adjustment mechanism 18a which allows for changing the contact preload 38 between the sides 28a of the bearing block and the corresponding sides 14a of the tracks on which the bearing block 28 slides. For example, one side of the bearing block may be adjustable between outer and inner lateral positions 52. The outer and inner lateral positions respectively correspond with contact preloads 38 (Cp) of the ball bearings pressing inwardly against the grooves in the outwardly facing sides of the rail assembly. One of the contact preloads is greater than the other contact preload ($Cp_2 > Cp_1$). By rearranging the tracks relative to the sides of the bearing block, it is possible for the bearings to press outwardly against inward facing sides of the rail assembly. The bearing block adjustment feature provides a smooth moving linear guide assembly that has sufficient tension to not have free-play or wobble in the movement of the assembly.

According to a particular embodiment of the bearing block preload system, one side of the bearing block 28 has a slot 28c, a threaded hole 28d, and a tapered screw 28e in the tapered hole. The slot divides an exterior region 28a' of the bearing block's side from an interior region 28a" of its side; the ball bearings are located within the interior region. The threaded hole has a center longitudinal axis 28d' extending towards the slot between the exterior and interior regions, and the slot extends inwardly from an outer surface along an entire length of the bearing block, from the end facing the fixed anvil 20 to the opposite end facing the end stop 54 at the distal end of the rail assembly. The tapered screw has seated positions 28e' in the threaded hole, with one seated position maintaining the slot as a space between the interior and outer regions to produce the baseline contact preload ($Cp_1$) and another seated position moving the interior region inwardly toward the first elongated groove to produce the higher contact preload ($Cp_2$).

The linear measurement system also includes mounting feet 58 attached to the bottom surface of the base. On the proximal end of the base, one set of mounting feet 58a add stability to the unit and provide a mounting surface for a digital display 60. This set of mounting feet also provides mounting for power wiring 62 and an optional machine cover. Another mounting foot 58b is under the distal end of the base. The mounting feet preferably carry rubber feet to provide a solid three point footing for the unit. The foot spacer preferably spaces the distal end rubber foot down to the same plane as the feet at the proximal end, so as to make for a stable resting of the device.

The digital readout 60 displays the measurement and/or outputs the data to a computer via its RS 232 output port. The system can also display or otherwise output the measurements in English units or metric units. The display mount preferably includes two ball mounts and connecting arms which allows the display to be rotated to various positions and orientations and moved away from workpieces that may extend over the scale. Other mounting options could have been used, such as structural bars and stands, arms and posts.

The system also provides linear error compensation and has a number preset features. Alternative digital readout systems could be used by the system, including but not limited to electromagnets, magnetic tape, laser measuring device, magnetic wire, glass scales, rotary encoders and pulse generators driven by a friction wheel or rack and pinion mechanical readers and/or any other means of a converting linear movement to a digital or analog display.

A particular embodiment of the present invention can use a commercially available linear ball bearing block. The bearing block can be modified with the slot to provide tight tolerances with sufficient friction for smooth, uniform movement, resulting in accurate measurements with low contact pressure. The slot can be produced by a wire EDM cut to create a fulcrum point between the interior region and the exterior region in the side of the bearing block. Preferably, two tapered threaded screws are used to adjust the ball track inward to set the preload for best balance between accuracy and feel. It will be appreciated that the cut could be produced by other machining methods, and the adjusting screws could be of another type and quantity. A commercially available linear encoder subassembly may also be used in the innovative design of the present invention. For example, a NEWALL Digital Measuring System can be used for the linear encoder subassembly.

Alternate channel anvils of other materials and shapes may be substituted or added to accommodate measuring different shaped objects. Shapes may include, but not limited to multi-surfaces, part specific profiles, and part specific fixture. Similarly, alternative fixed anvils of other materials and shapes may be substituted or added to accommodate measuring different shaped objects. Shapes may include, but not limited to one or more faces at various planes, part specific profiles, and part specific fixture. Materials may include, but not limited to steel, carbide, aluminum, brass and plastic.

In the particular embodiment, the base is preferably an extruded aluminum tube with a wall thickness of ¼" and having 2"×4" cross-sectional dimensions. The tube serves as a base onto which the other components are attached and can be extruded to various lengths to suit the corresponding length of the measurement device. Other materials and shapes could be substituted to achieve other characteristics such as greater thermal stability, lighter or heavier weight, and size capacity. Materials may include but not limited to steel, granite, honeycomb and composites. Shapes may include, but not limited to square tubing, solid bars, channel, tee, and other structural shapes and extrusions.

In the particular embodiment, the linear scale anchor mount is an aluminum block mounted to the base via a bolt and has an oversize hole through which the scale extends. The hole permits some radial float of the scale to minimize drag of the reader head and to allow thermal length change of various components. Different anchor mounts and configurations may be used with different types or brands of digital scales.

The top plate 10 is 4140 steel. It is machined so as to provide mounting for the linear bearing block, the channel anvil, the linear scale reader, the handle or knob 64 and the knob spacer 66. The knob spacer spaces the knob off the top plate to allow for more ergonomic control of the moving components. All of the moving components are mounted to the linear guide assembly. The handle or knob is used to provide manual movement of the channel anvil into contact with the workpiece.

The beam is preferably made of S7 steel at 60-62 RC hardness. As indicated above, the beam provides a track to guide the linear bearing block via two V-shaped bearing grooves for steel ball bearings housed in the bearing blocks. Parallelism of the bearing grooves is important for accuracy and smoothness. After grinding, these grooves are lapped for final finish and tolerance.

As indicated above, in the center top of the beam is a channel for holding the workpiece. In a preferred embodiment, the channel has a 90° V-shape. At one end of the rail are mounting holes for the stationary anvil and a notched area that provides the space for the larger diameter heads of ejector and core pins that are measured by the system. As also indicated above, the top ground surfaces of the rail provides a surface to rest a workpiece with a flat surface and provides the ability to mount a special purpose fixture to locate odd shaped objects to be measured. A series of bolt holes extending through the bottom of the channel along the length of the beam mount the rail assembly to the base.

A unit with the ability to measure workpieces up to 18" in length uses one 24" long rail. A unit with the ability to measure workpieces up to 42" in length uses two matched 24" long rails, mounted end to end. Other length rails may be used according to the general teachings of the present invention.

This linear measuring system uses the rail and bearing block combination described above. Other guide and work holding components could be used, including, but not limited to bearings other than ball bearings. For example, bushings of metal or plastic riding on round or other shaped rods, air bearings riding on a film of pressurized air, multiple rails or rods may also be used.

The panel mount provides the electrical connection for removable 110V power cord. The cable tray provides mounting and guidance for the wire chain to the machine base. The top cable tray provides mounting and guidance for the wire chain to the top plate.

The end cap for the stationary anvil on the first end of the work holding fixture closes the end of the base tubing and holds the cable grommet in place. Electric components are housed within the base tubing for protection and neatness. The end cap for the moving anvil on the second end of the work holding fixture closes the end of the base tubing.

The wire chain provides management of cabling between moving member of device, carrying the linear scale reader and the non-moving members of the device to which the digital read out is mounted. Other cable management systems could have been used including, but not limited to coil springs, flat springs and cord reels.

The linear guide assembly and the V-shape channel holds the workpiece flat and square to the measuring anvils. This allows for more accuracy in measuring and reduces potential measurement errors from a misalignment of the workpiece or from a bending of the workpiece. This also allows an operator of the machine to quickly move from measuring a two inch long pin to measuring a thirty-eight inch long pin without making adjustments to add supports along the length of the longer pin and without having to check that the alignment of the longer pin is the same as the shorter pin or ensuring that the pins are in proper alignment while operating the linear guide assembly. The system also has ability directly output measurements to inspection software or computer for quality control measures. The invention has proven to save hours on a job with higher accuracy levels than obtainable with current methods. The invention is also capable of measuring in English and metric scales, as well as absolute or incremental.

Figure 6:
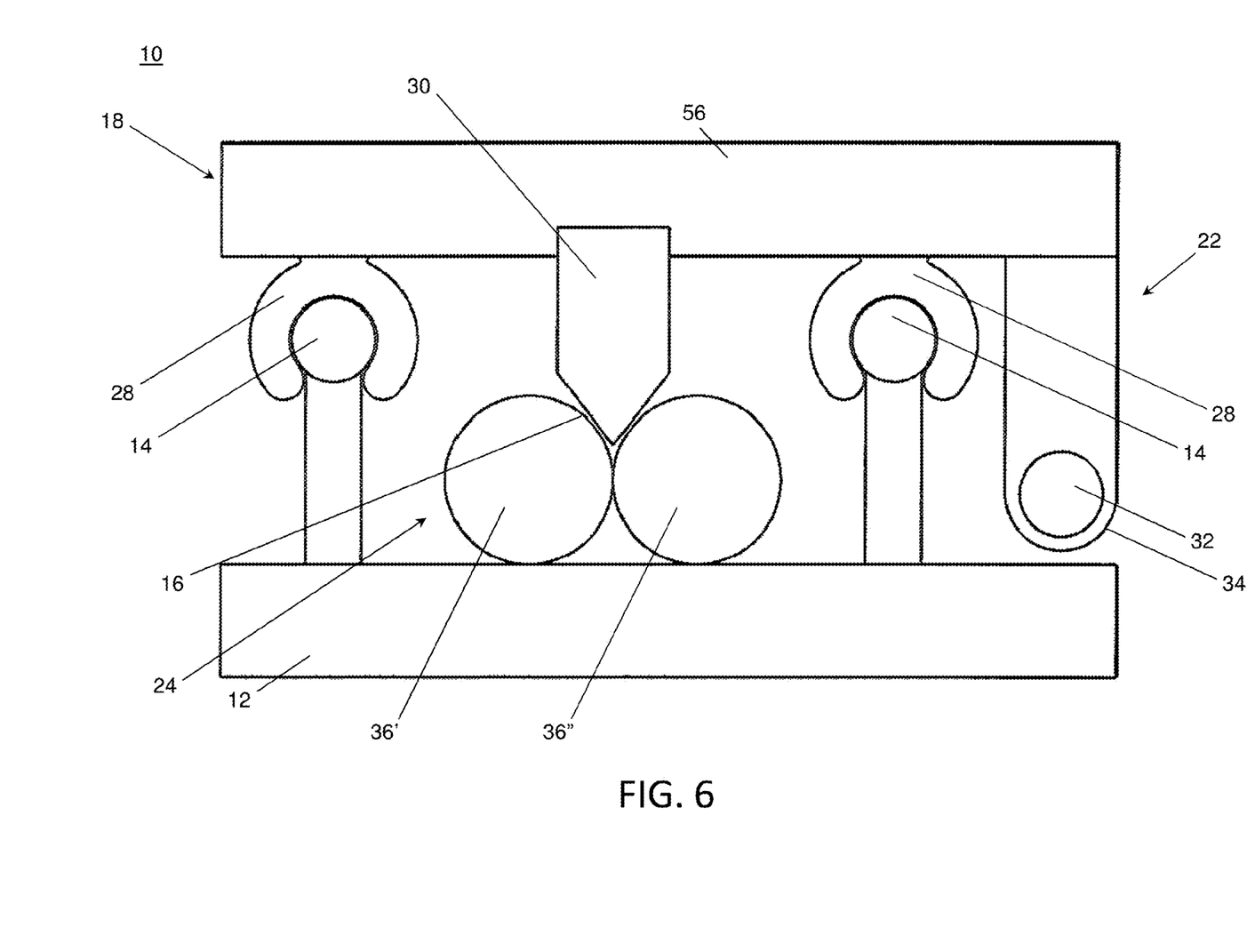
Figure 7:
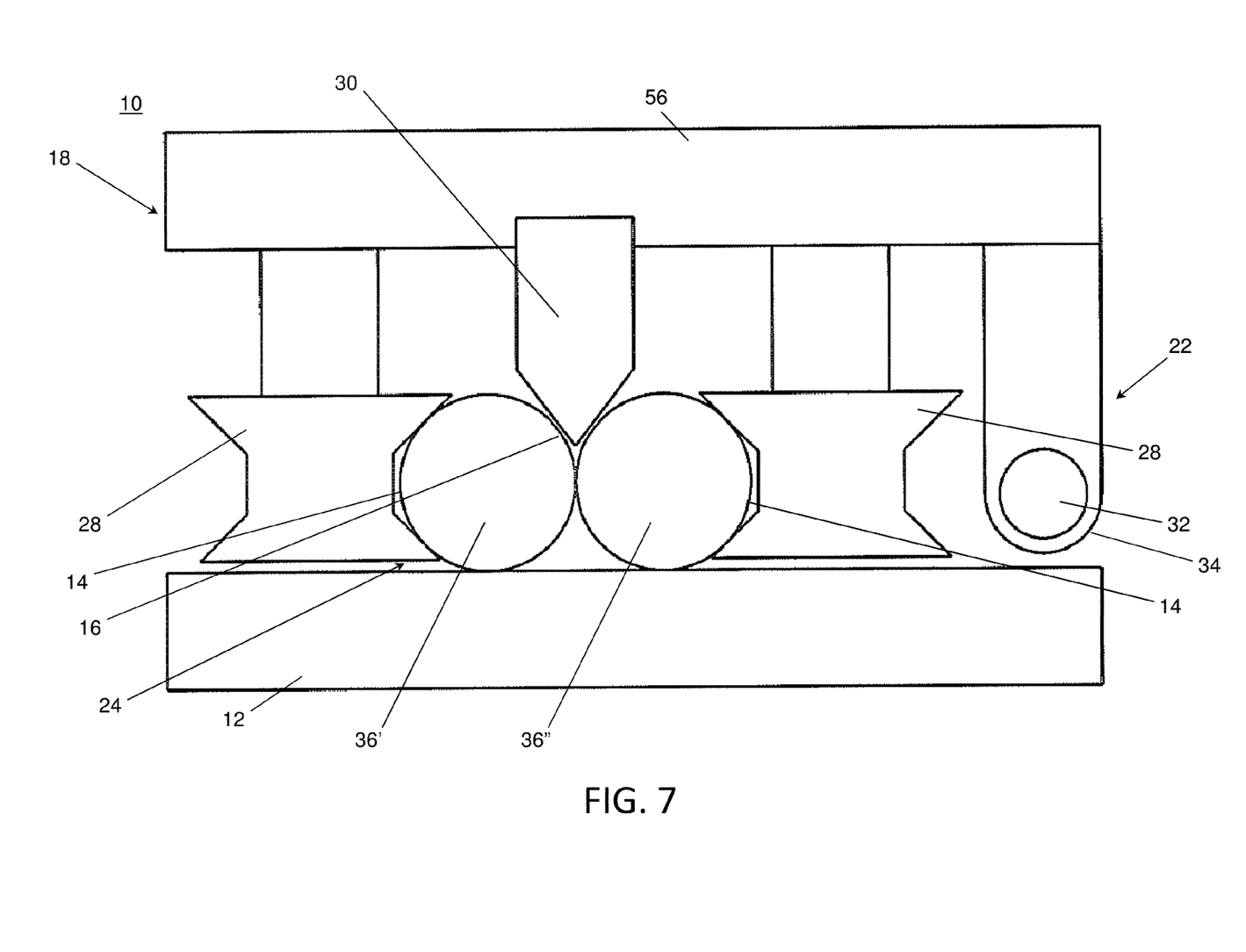

Variations of the invention include the guide system of the device could be of many off the shelf and/or modified guide systems, including, but not limited to rails and bearing blocks of different sizes and shapes. The number and shapes of bearing tracks can also be varied to include round, needle, barrel, etc. Air bearings, plastic bearings, and yellow metal bearings could also be used. Possible variations are shown in FIGS. 5, 6 and 7. As indicated above, the tracks may be a pair of elongated grooves on opposite sides of a single elongated beam, and as explained further below, the tracks may alternatively be a pair of elongated rails on opposite sides of an elongated beam, a pair of elongated rods positioned on opposite sides of the elongated channel, or a pair of elongated cylindrical shafts. Similarly, as explained above, the elongated channel may be a V-shaped recess in the top side of the elongated beam or a V-shaped region bounded between a pair of elongated cylindrical shafts.

The linear measurement system 10 shown in FIG. 5 has a linear guide 18 with multiple bearing blocks 28 mounted on the outwardly facing sides of the beam 36 and connected by a top plate 56. As in the device described above with reference to FIGS. 1 and 3 and in the alternative arrangements described below with reference to FIGS. 6 and 7, the linear guide 18 provides parallel travel to the channel 16, and the linear guide 18 holds the channel anvil 30. The channel can be a square or rectangular block with a V-shape recess, two round, hexagon, triangular or square bars mounted side-by-side.

The linear measurement system 10 shown in FIG. 6 has a pair of guide rail tracks 14 that are spaced apart from the channel and center beam 36. The linear guide assembly 18 is formed by guide bushings that are mounted on the guide rail tracks and are connected by a top plate 56. The guide bushings each serves as a bearing block 28 on its respective guide rail track. In this particular embodiment the center beam is formed by a pair of elongate cylindrical shafts 36', 36". As indicated above, the channel can be a square or rectangular block with a V-shape recess, with two round, hexagon, triangular or square bars mounted side by side. The guide bushing can be any of, but not limited to, ball bearing-type, plastic bushing or air bearing.

The linear measurement system 10 shown in FIG. 7 is similar to the device shown in FIG. 6 because it also has a center beam is formed by a pair of elongate cylindrical shafts 36', 36". However, rather than having a pair of guide rail tracks that are spaced apart from the channel and center beam, the outwardly facing sides of the cylindrical shafts 36', 36" serve as the tracks 14 for the device in FIG. 7. The linear guide assembly 18 is formed by any suitable bearing blocks 28 that engage with the tracks 15 and are connected by a top plate 56.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it is possible for the rail assembly to serve as the base in which case the linear encoder assembly's anchors would connect directly to the rail assembly, such as described in U.S. Pat. No. 7,845,092 which is incorporated by reference herein. Thus, the breadth and scope of the present invention should not be limited by any of the above-described exemplary embodiments, but should be defined only in accordance with the following claims appended hereto and their equivalents.

What is claimed is:

1. A linear measuring system for a workpiece, comprising:
   a rail assembly comprising a pair of elongated tracks, wherein said elongated tracks extend from a first end to a second end and have longitudinal axes substantially parallel to each other;
   an elongated channel positioned between said pair of elongated tracks, wherein said elongated channel is comprised of a first elongated surface, a second elongated surface, a bottom between said first elongated surface and said second elongated surface, a proximal end, a distal end, and a central longitudinal axis, wherein said first elongated surface and said second elongated surface extend upwardly from said bottom in a diverging relationship to each other to a pair of upper edges and are positioned on opposite sides of said central longitudinal axis and face inwardly towards said central longitudinal axis, wherein said proximal end and said distal end are respectively proximate to said first end and said second end of said elongated tracks, and wherein said central longitudinal axis is substantially parallel to said longitudinal axes of said elongated tracks;
   a linear guide assembly slidingly mounted to said rail assembly, wherein said linear guide assembly slides from a first position proximate to said distal end of said elongated channel to a second position proximate to said proximal end of said elongated channel, wherein said linear guide assembly comprises a bearing block and a channel anvil, wherein said bearing block is positioned over said upper edges of said elongated channel and slides on said pair of elongated tracks between said first position and said second position, wherein said channel anvil has a mounting end and a cantilevered end, wherein said mounting end is connected to said bearing block above said upper edges of said elongated channel, and wherein said cantilevered end extends downwardly from said mounting end to a location proximate to said bottom of said elongated channel below said upper edges of said elongated channel and between said first elongated surface and said second elongated surface;
   a fixed anvil aligned with said central longitudinal axis and positioned proximate to said proximal end of said elongated channel; and a linear encoder assembly mounted adjacent to said rail assembly, wherein said linear encoder is comprised of an elongated scale, a reader head, a proximal anchor, and a distal anchor, wherein said proximal anchor and said distal anchor are respectively positioned proximate to said proximal end and said distal end of said elongated channel, wherein said elongated scale extends between said proximal anchor and said distal anchor and is aligned with and offset from said elongated channel, wherein said elongated scale has a longitudinal axis substantially parallel to said central longitudinal axis, and wherein said reader head is secured to said bearing block and slides in reading engagement with said elongated scale.

2. The linear measuring system of claim 1, wherein said elongated channel has a V-shape cross-section in a plane perpendicular to said central longitudinal axis.

3. The linear measuring system of claim 2, wherein the workpiece has an elongated cylindrical body and is continuously supported along its length by said elongated channel serving as a cradle for the workpiece, wherein said elongated cylindrical body is aligned within said elongated channel by said first elongated surface and said second elongated surface.

4. The linear measuring system of claim 3, further comprising a space between said proximal end of said elongated channel and said fixed anvil, wherein the workpiece has a larger diameter head portion connected to said elongated cylindrical body, and wherein said head portion extends below said bottom of said elongated channel in said space.

5. The linear measuring system of claim 2, wherein said rail assembly is further comprised of an elongated beam with a first outwardly facing side, a second outwardly facing side and a top side, wherein said elongated tracks are attached to or formed in said outwardly facing sides, wherein said elongated channel is formed as a recess in said top side of said elongated beam between said outwardly facing sides, wherein said top side has a first elongated top surface extending between said first elongated surface and said first outwardly facing side and a second elongated top surface extending between said second elongated surface and said second outwardly facing side, and wherein said first elongated top surface and said second top elongated surface are in a plane substantially parallel to said top surface of said base.

6. The linear measuring system of claim 5, wherein the workpiece has a substantially flat surface wider than said elongated channel and is supported by said first elongated top surface and said second elongated top surface.

7. The linear measuring system of claim 6, further comprising a base on which said rail assembly and said linear encoder assembly are mounted and a fixture mounted to said rail assembly for supporting and aligning the workpiece between said fixed anvil and said channel anvil, wherein said fixture is removable from said rail assembly for an elongated cylindrical workpiece cradled in said elongated channel, wherein said rail assembly is fixedly connected to said base through a set of bolts, and wherein said linear encoder assembly is fixedly connected to said base through said proximal anchor and said distal anchor.

8. The linear measuring system of claim 5, wherein said elongated tracks are comprised of a first elongated groove machined into said first outwardly facing side and a second elongated groove machined into said second outwardly facing side, wherein said bearing block is comprised of a first side, a second side, and a center portion between said first side and said second side, wherein said first side houses a first set of ball bearings engaged with said first elongated groove and said second side houses a second set of ball bearings engaged with said second elongated groove.

9. The linear measuring system of claim 8, wherein said first side of said bearing block is adjustable between a first lateral position and a second lateral position, wherein said first lateral position and said second lateral position respectively correspond with a first contact preload and a second contact preload of said ball bearings pressing inwardly against said elongated grooves in said outwardly facing sides of said rail assembly, and wherein said second contact preload is greater than said first contact preload.

10. The linear measuring system of claim 9, wherein said first side of said bearing block is further comprised of a slot, a threaded hole, and a tapered screw in said tapered hole, wherein said slot divides an exterior region of said first side from an interior region of said first side, wherein said threaded hole has a center longitudinal axis extending towards said slot between said exterior region and said interior region, wherein said first set of ball bearings are located within said interior region, wherein said slot extends inwardly from an outer surface along an entire length of said bearing block, wherein said tapered screw has a first seated position within said threaded hole and a second seated position within said threaded hole, wherein said first seated position maintains said slot as a space between said interior region and said outer region and produces said first contact preload, and wherein said second position moves said interior region inwardly toward said first elongated groove and produces said second contact preload.

11. The linear measuring system of claim 1, wherein said pair of elongated tracks are selected from the group of guide elements consisting of a pair of elongated grooves on opposite sides of an elongated beam, a pair of elongated rails on opposite sides of an elongated beam, a pair of elongated rods positioned on opposite sides of said elongated channel, and a pair of elongated cylindrical shafts, and wherein said elongated channel is at least one of a V-shaped recess in said top side of said elongated beam and a V-shaped region bounded between said pair of elongated cylindrical shafts.

12. A linear measuring system for a workpiece, comprising:
a base having a top surface and a bottom surface;
an elongated cradle fixedly connected to said top surface of said base, wherein said elongated cradle is comprised of a proximal end, a distal end, a first inwardly facing surface and a second inwardly facing surface extending between said proximal end and said distal end, a bottom between said first inwardly facing surface and said second inwardly facing surface, and a central longitudinal axis, wherein said first inwardly facing surface and said second inwardly facing surface extend from said bottom in a diverging relationship to each other toward a pair of upper sides and are positioned on opposite sides of said central longitudinal axis facing towards said central longitudinal axis;
a linear guide assembly slidingly positioned on said elongated cradle, wherein said linear guide assembly slides from a first position proximate to said distal end of said elongated cradle to a second position proximate to said proximal end of said elongated cradle, wherein said linear guide assembly comprises a bearing block and a channel anvil, wherein said bearing block is in sliding contact with said elongated cradle, wherein said channel anvil has a mounting end and a cantilevered end, wherein said mounting end is fixedly connected to said bearing block, wherein said cantilevered end extends downwardly from said mounting end to a location proximate to said bottom of said elongated cradle below said upper sides of said elongated cradle and between said first elongated surface and said second elongated surface;

a fixed anvil aligned with said central longitudinal axis and positioned proximate to said proximal end of said elongated cradle; and a linear encoder assembly fixedly connected to said top surface of said base, wherein said linear encoder comprises an elongated scale, a reader head, a proximal anchor, and a distal anchor, wherein said proximal anchor and said distal anchor are respectively secured to said base proximate to said proximal end and said distal end of said elongated cradle, wherein said elongated scale extends between said proximal anchor and said distal anchor and is aligned with and is offset from said elongated cradle, wherein said elongated scale has a longitudinal axis substantially parallel to said central longitudinal axis, and wherein said reader head is secured to said bearing block and slides in reading engagement with said elongated scale.

13. The linear measuring system of claim 12, wherein said elongated cradle further comprises a first outwardly facing side and a second outwardly facing side extending between said proximal end and said distal end, and wherein said first inwardly facing surface and said second inwardly facing surface have a V-shape cross-section in a plane perpendicular to said central longitudinal axis.

14. The linear measuring system of claim 13, wherein said elongated cradle further comprises a first elongated top surface extending between said first elongated surface and said first outwardly facing side and a second elongated top surface extending between said second elongated surface and said second outwardly facing side, and wherein said first elongated top surface and said second top elongated surface are in a plane substantially parallel to said top surface of said base.

15. The linear measuring system of claim 13, wherein said first outwardly facing side further comprises a first elongated track, wherein said second outwardly facing side further comprises a second elongated track, wherein said bearing block is comprised of a first side, a second side, and a center portion between said first side and said second side, wherein said first side contacts said first outwardly facing side, wherein said second side contacts said second outwardly facing side, and wherein said center portion is positioned over said elongated cradle.

16. The linear measuring system of claim 15, wherein said first elongated track is comprised of a first elongated groove in said first outwardly facing side and said second elongated track is comprised of a second elongated groove in said second outwardly facing side, wherein said first side of said bearing block houses a first set of ball bearings engaged with said first elongated groove, and wherein said second side of said bearing block houses a second set of ball bearings engaged with said second elongated groove.

17. The linear measuring system of claim 15, wherein at least one of said first side and said second side of said bearing block is adjustable between a first lateral position and a second lateral position, wherein said first lateral position and said second lateral position respectively correspond with a first contact preload and a second contact preload of said bearing block sides pressing inwardly against said outwardly facing side of said elongated tracks, and wherein said second contact preload is greater than said first contact preload.

18. A linear measuring system for a workpiece, comprising:

a base having a top surface and a bottom surface;

a rail assembly fixedly connected to said top surface of said base, wherein said rail assembly comprises a first elongated track and a second elongated track, wherein said elongated tracks extend from a first end to a second end and have longitudinal axes substantially parallel to each other;

a bearing block slidingly connected to said elongated tracks, wherein said bearing block slides from a first position proximate to said first end of said elongated tracks to a second position proximate to said second end of said elongated tracks, wherein said bearing block is comprised of a first side, a second side, and a center portion between said first side and said second side, wherein said first side is in sliding engagement with said first elongated track, wherein said second side is in sliding engagement with said second elongated track, wherein said center portion moves between said first position and said second position along a lengthwise axis substantially parallel to said longitudinal axes, wherein at least one of said first side and said second side of said bearing block is adjustable between a first lateral position and a second lateral position, wherein said first lateral position and said second lateral position respectively correspond with a first contact preload and a second contact preload of said bearing block sides pressing against said elongated tracks, and wherein said second contact preload is greater than said first contact preload;

a fixed anvil aligned with said lengthwise axis and positioned proximate to said first end of said elongated tracks; and a linear encoder assembly fixedly connected to said top surface of said base, wherein said linear encoder is comprised of an elongated scale, a reader head, a proximal anchor, and a distal anchor, wherein said proximal anchor and said distal anchor are respectively secured to said base proximate to said first end and said second end of said elongated tracks, wherein said elongated scale extends between said proximal anchor and said distal anchor and has a longitudinal axis substantially parallel to said lengthwise axis, and wherein said reader head is secured to said bearing block and slides in reading engagement with said elongated scale.

19. The linear measuring system of claim 18, wherein said rail assembly is further comprised of an elongated beam with a first outwardly facing side, a second outwardly facing side and a top side, wherein said first elongated track is comprised of a first elongated groove in said first outwardly facing side, wherein said second elongated track is comprised of a second elongated groove in said second outwardly facing side, wherein said first side of said bearing block houses a first set of ball bearings in contact with said first elongated groove, wherein said second side of said bearing block houses a second set of ball bearings in contact with said second elongated groove, wherein said first side of said bearing block is further comprised of a slot, a threaded hole, and a tapered screw in said tapered hole, wherein said slot divides an exterior region of said first side from an interior region of said first side, wherein said threaded hole has a center longitudinal axis extending towards said slot between said exterior region and said interior region, wherein said first set of ball bearings are located within said interior region, wherein said slot extends inwardly from an outer surface along an entire length of said bearing block, wherein said tapered screw has a first seated position within said threaded hole and a second seated position within said threaded hole, wherein said first seated position maintains said slot as a space between said interior region and said outer region and produces said first contact preload, and wherein said second position moves said interior region inwardly toward said first elongated groove and produces said second contact preload.

20. The linear measuring system of claim 18, further comprising an elongated cradle and a channel anvil, wherein said elongated cradle is fixedly connected to said top surface of said base, wherein said elongated cradle is comprised of a proximal end, a distal end, a first inwardly facing surface and a second inwardly facing surface extending between said proximal end and said distal end, a bottom between said first inwardly facing surface and said second inwardly facing surface, and a central longitudinal axis parallel to said lengthwise axis, wherein said first inwardly facing surface and said second inwardly facing surface extend from said bottom in a diverging relationship to each other toward a pair of upper edges and are positioned on opposite sides of said central longitudinal axis facing towards said central longitudinal axis, wherein said channel anvil has a mounting end and a cantilevered end, wherein said mounting end is connected to said bearing block above said upper edges of said elongated cradle and moves in said lengthwise axis, and wherein said cantilevered end extends downwardly from said mounting end through said central longitudinal axis to a location proximate to said bottom of said elongated cradle below said upper edges of said elongated cradle and between said first elongated surface and said second elongated surface.

\* \* \* \* \*